W. H. McLAUGHLIN.
CHAIN LINK CONNECTOR.
APPLICATION FILED APR. 20, 1917.

Reissued Sept. 18, 1917.

14,361.

Inventor
William H. McLaughlin
By Wm. H. Babcock & Son
Attorneys

UNITED STATES PATENT OFFICE.

WILLIAM H. McLAUGHLIN, OF HARTFORD, CONNECTICUT, ASSIGNOR, BY MESNE ASSIGNMENTS, TO CASSIUS S. CHASE, OF HARTFORD, CONNECTICUT.

CHAIN-LINK CONNECTOR.

14,361. Specification of Reissued Letters Patent. Reissued Sept. 18, 1917.

Original No. 1,166,068, dated December 28, 1915, Serial No. 27,089, filed May 10, 1915. Application for reissue filed April 20, 1917. Serial No. 163,418.

*To all whom it may concern:*

Be it known that I, WILLIAM H. McLAUGHLIN, a citizen of the United States, residing at Hartford, in the county of Hartford and State of Connecticut, have invented certain new and useful Improvements in Chain-Link Connectors, of which the following is a specification.

This invention relates to chain-link connectors of the snap-hook type and has for its objects to provide a strong solid metal open connector with a pivoted sheet metal guard, to keep the respective end-links of the two chains in their respective eyes or on the respective hooks of the connector, thus guarding against their becoming superposed and, by twisting, moving the guard on its pivot, and further, to provide spring or resilient means carrying locking means engaging with the solid metal part of the connector to prevent the guard from turning on its pivot, either by gravity or the possible twisting action of the end links of the chains, all of which objects are accomplished by the combination, construction and arrangement of parts as hereinafter more particularly set forth, described and claimed.

Figure 1:
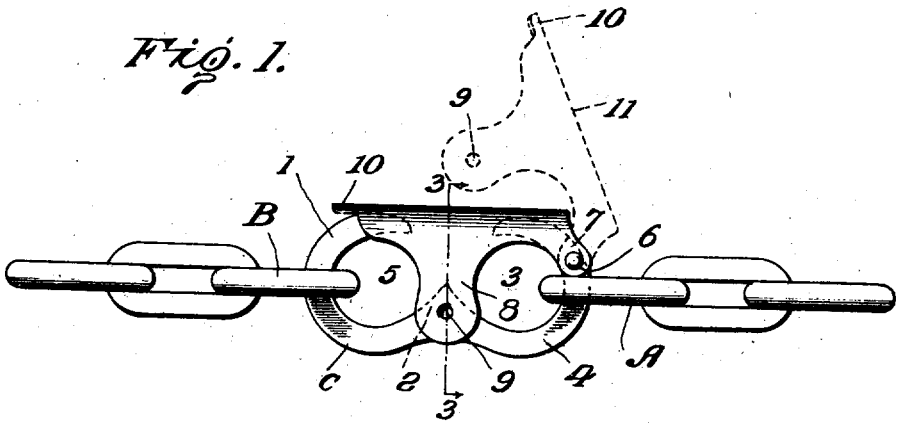
Figure 1 represents a side elevation of my invention as applied and closed, the guard being shown, in dotted lines, in its extreme open position.
Figure 2:
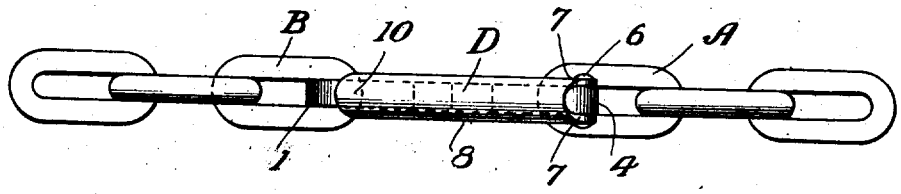
Fig. 2 represents a top plan view of the same.

Referring now in detail to the drawings, A indicates the end link of one of the chains to be connected and B indicates the end link of the other chain, these two links slipping successively over the free end 1 of the connector C, the link A being slipped over the central dividing point 2 between the two hooks and coming to a stop in the eye 3 against the inner edge of the end, hook or section 4 of the connector C and the link B retaining its position in the other eye 5, bearing against the inner edge of the end, hook or section 1 of the connector.

Figure 3:
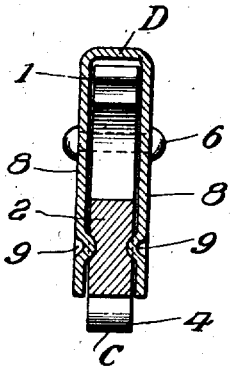
Fig. 3 represents a cross-sectional view on the line 3—3 of Fig. 1, looking in the direction of the arrows.

To the upper part of the hook or section 4, by means of the pivot 6 passing therethrough, is pivotally connected the bifurcated end 7 of the guard D, which is preferably stamped out of resilient sheet metal. This guard D is of sufficient length to extend well over the space or opening between the adjacent ends of the sections or hooks 1 and 4, and is provided on each side midway between its two ends with a resilient integral downward extension or clamping plate 8, the interval between these two clamping plates 8 corresponding to the thickness of the dividing point 2, see Fig. 3. These two plates are provided with registering inwardly presented lugs 9 stamped in the material of each clamp member or plate 8 and integral therewith. These lugs 9 snap into corresponding lateral recesses in the sides of point 2 and thereby lock the guard in closed position.

It will be noted that this makes a very strong lock, vertical strain being resisted equally by the resiliency of both plates 8 and any lateral strain acting to force one plate 8 toward the connector C while trying to force the other away, so that in all cases the effect of any lateral strain on one plate will be counteracted by its effect on the other plate.

The free end of the guard D is provided with an integral extension 10, see Fig. 1, so that any convenient nail or tool may be inserted thereunder for purposes of prying the guard open.

It will be understood that any suitable materials may be used for the several parts.

It is my intention and desire that the following claims be given the broadest construction consistent with their wording.

Having thus described my invention, what I claim as new and desire to secure by Letters Patent is:

1. A chain link connector consisting of a single piece of non-resilient metal divided into two eyes by a dividing point and adapted to receive strain in a straight line in opposite directions from the respective terminal links of two chains, said dividing point being provided with two registering lateral recesses, in combination with a guard having a bifurcated end pivotally connected to said piece of metal adjacent one of the sides thereof, the other end of said guard projecting slightly over the other end of said piece for the purpose set forth and having between its ends two integral resilient dividing plates extending down along the sides of said dividing point and provided with lateral inwardly presented lugs fitting into said recesses, said plates preventing the terminal link of either chain from working into the wrong eye during slackness of the chain.

2. A chain link connector consisting of a single piece having two eyes divided by a raised point, in combination with a guard having a bifurcated end pivotally connected to said piece adjacent one end thereof, extending over the opening between the two ends of said piece and provided with a pair of resilient dividing plates extending down along the sides of said raised point in order to prevent the passage of an endless article from one eye into the other eye when the guard is shut, the faces of the eyes being formed to receive strain in opposite directions only.

3. A chain connector consisting of a single piece of metal formed with two hooks arranged to receive chain links and resist pull in opposite directions, and a guard, having one end pivoted to one hook and the other end adapted to overlie the other hook for closing the opening between the hooks, said guard having two resilient arms that extend laterally across the opening between the hooks and are adapted to clasp the body of the connector between the hooks so as to divide the space embraced by the hooks into two separated eyes and prevent the passage of a link from one hook to the other when the guard is closed.

4. A device to connect the links of a chain consisting of a part having two hooks presented toward each other, leaving an open space between their adjacent ends and adapted to receive strain or pull in opposite directions, in combination with a guard pivotally connected to said part at one end and, in closed position, guarding said open space and extending down between the adjacent ends of the hooks to prevent the passage of an endless article from one of said hooks to the other, said guard being provided with a pair of resilient plates to grip between them a portion of said part for the purpose of holding said guard in closed position.

5. A device, to connect the links of a chain, consisting of a part having two hooks presented substantially toward each other, leaving an open space between their ends and adapted to receive chain links, said hooks being connected by a body portion in combination with a guard permanently mounted on said part and, in closed position, guarding said open space and extending between the adjacent ends of said hooks toward said body portion to prevent the passage of an endless article from one of said hooks to the other, said guard being provided with a pair of resilient plates to engage said part to hold said guard in closed position.

WILLIAM H. McLAUGHLIN.